J. W. WEIR.
HEAD FOR RUBBER STRAINING MACHINES.
APPLICATION FILED JAN. 16, 1911.
1,007,016.
Patented Oct. 24, 1911.
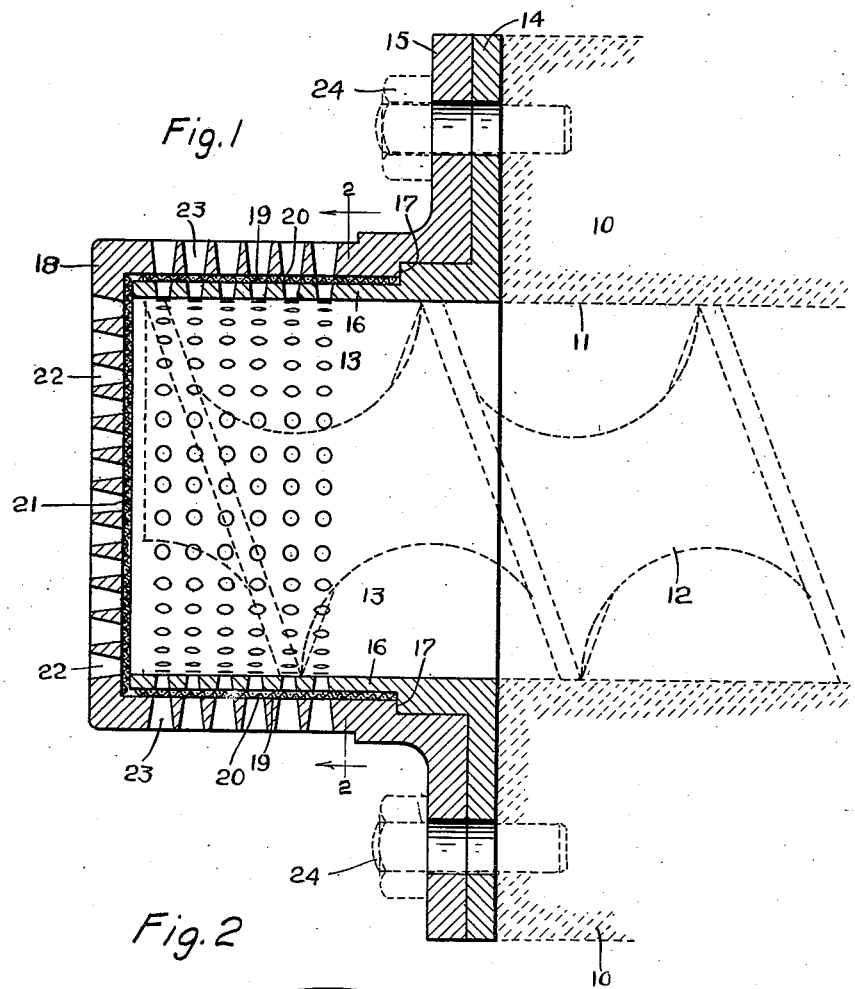
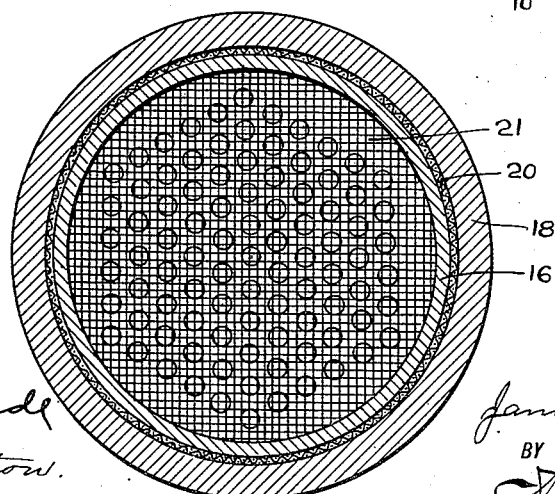
WITNESSES:
H. W. Meade
S. W. Atherton.
INVENTOR
James W. Weir
BY
J. M. Wooster
ATTORNEY

UNITED STATES PATENT OFFICE.

JAMES W. WEIR, OF BRIDGEPORT, CONNECTICUT, ASSIGNOR TO THE HOUSATONIC MACHINE AND TOOL COMPANY, OF BRIDGEPORT, CONNECTICUT, A CORPORATION OF CONNECTICUT.

HEAD FOR RUBBER-STRAINING MACHINES.

1,007,016.      Specification of Letters Patent.      Patented Oct. 24, 1911.

Application filed January 16, 1911. Serial No. 602,816.

*To all whom it may concern:*

Be it known that I, JAMES W. WEIR, a citizen of the United States, residing at Bridgeport, county of Fairfield, State of Connecticut, have invented an Improvement in Heads for Rubber-Straining Machines, of which the following is a specification.

This invention relates to machines for straining rubber and has for its general object to greatly improve the construction of the straining heads.

It is one of the objects of the invention to produce a straining head that will not clog in use.

A further object of the invention is to produce a straining head that will prevent the passage of pieces of metal and other solid matter and which may be readily taken apart for cleaning.

My novel structure is adapted for use in straining all kinds of rubber and is particularly adapted for straining reclaimed rubber, that is old rubber obtained from various sources and especially rubber from old tires, which is likely to contain tacks and other pieces of metal that may have been picked up and retained by the tires.

With these and other objects in view I have devised the novel straining head of which the following description in connection with the accompanying drawing is a specification, reference characters being used to indicate the several parts.

Figure 1 is a section of my novel straining head as in use, the screw being indicated by dotted lines; and Fig. 2 is a section on the line 2—2 in Fig. 1 looking in the direction of the arrows.

10 denotes the framework of the machine which is a heavy casting and is provided with a circular opening 11 in which the screw 12 (indicated by dotted lines) operates. My novel straining head extends outward from the framework of the machine and is provided with a chamber 13 in alinement with the opening in the framework and into which the screw extends. The head is made in two parts which are indicated respectively by 14 and 15. Part 14 comprises a base and a central hub 16 having an external circular shoulder 17. Part 15 consists of a corresponding base and a cap 18 which incloses the hub and is provided with a shoulder engaging shoulder 17 on the hub. Between the outer wall of the hub and the inner wall of the cap and extending outward from shoulder 17 is a circular recess 19 which receives a ring-shaped screen 20. Contiguous to the inner face of the cap is a circular screen 21, the edge of which lies between the cap and the outer end of the hub. The face of the hub is provided with holes 22 which taper outward from the screen, the purpose of the outward taper of the holes being to prevent the possibility of clogging. The sides of the hub and cap are provided with tapering holes 23 which taper from the inner side of the hub outward the same as holes 22, the screen lying between the portions of the holes in the hub and the portions in the cap. It will be noted that the tapered walls of the holes in cap 18 are in alinement with the tapered walls of the holes in the hub. I have described the screen as consisting of ring-shaped and circular portions. It is of course wholly immaterial, however, how the screen is made or of what material, wire netting being ordinarily used. The object of the screen is to collect tacks, pieces of metal and other solid matter that may be in impure rubber and prevent them from being forced through the straining head. It is of course essential that the side portions of the screen be placed out of contact with the screw and furthermore that the screen be readily removable for cleaning. These results are effectually accomplished by the structure illustrated, that is socketing the side portion of the screen in the circular recess. The parts of the straining head are secured to the framework of the machine in any ordinary or preferred manner as by bolts 24. Whenever it is required to clean the screen the bolts are taken out and the parts of the head separated, which leaves the screen whether in one or more pieces free to be removed and cleaned. The operation of the screw is the same as in ordinary rubber straining machines

Having thus described my invention I claim:

1. A straining head comprising a hub open at both ends, a perforated cap inclosing said hub, the end wall of said cap closing one end of said hub, said hub and cap being provided with complemental shoulders of different height, whereby a space is formed between the hub and the cap, a screen secured in said space, and a circular screen held between the end wall of said cap and the adjacent end of the hub.

2. A straining head comprising a hub open at both ends, a perforated cap inclosing said hub and having an annular flange, the end wall of said cap closing one end of said hub, the other end of said hub being provided with an annular flange, said hub and cap being also provided with complemental annular shoulders of different height, whereby a space is formed between the hub and the cap, a screen secured in said space, a circular screen held in position by the end wall of said cap, and means for uniting said flanges.

3. A straining head comprising a hub open at both ends and provided with side openings that taper in width, a cap inclosing said hub in a spaced relation and provided with tapering side and bottom openings, the side openings of the hub and cap being in alinement, a screen interposed between the sides of the cap and the hub, and a screen interposed between the bottom of the cap and the adjacent end of the hub.

In testimony whereof I affix my signature in presence of two witnesses.

JAMES W. WEIR.

Witnesses:
 HENRY C. FRESHOUR,
 A. H. CANFIELD.